Patented Feb. 23, 1954

2,670,393

UNITED STATES PATENT OFFICE 2,670,393

POLYMERIZATION OF ISOBUTENE WITH ANHYDROUS SULFUR TRIOXIDE CATALYST

Murlin T. Howerton, Notre Dame, Ind., assignor to University of Notre Dame Du Lac, Notre Dame, Ind., a corporation of Indiana No Drawing. Application January 10, 1952,
Serial No. 265,923

6 Claims. (Cl. 260—683.15)

This invention relates to a novel method for the production of polyisobutenes, and more particularly to the catalytic polymerization of isobutene to form low molecular weight polyisobutenes.

It is a particular object of the present invention to catalytically polymerize isobutene in a controlled manner, whereby a high yield of relatively simple polymer reaction product mixture is formed and which is composed essentially of diisobutene, triisobutene, and tetraisobutene. In view of the absence of a large variety of individual compounds, as is common in other processes, these individual polymers may be readily separated in a high degree of purity by such means as fractionation.

In carrying out the process of the present invention I employ anhydrous sulfur trioxide as the catalyst. Although some sulfonated material results therefrom, its formation is held to a minimum, it is readily separable from the hydrocarbon reaction products, and is recoverable as a useful side product.

In one specific and preferred embodiment of the invention, vapor phase isobutene is contacted with a vapor phase mixture of sulfur trioxide and dry air or other inert gas, e. g., nitrogen or carbon dioxide. The isobutene polymers together with some water soluble sulfonated side products are formed immediately and separate from the gaseous reaction mixture. These side products are insoluble in the hydrocarbon polymer and are easily separated. Any emulsified side products in the hydrocarbon phase can be removed by a water wash. The hydrocarbon phase consists only of diisobutene, triisobutene, tetraisobutene and very small amounts of higher polymers. No intermediate hydrocarbon compounds are formed.

The extent of conversion of isobutene and the relative amounts of the various polymers and sulfonated side products formed are essentially dependent upon the ratio of sulfur trioxide to isobutene, and to varying extent upon the amount of inert gas used, the total pressure, and the reaction temperature. Within limits, the relative amounts of the various products can be controlled by proper regulation of these variables.

The most important variable is the ratio of sulfur trioxide to isobutene. The useful values for the mole ratio of sulfur trioxide to isobutene range from 0.01 to 0.05. In this discussion all ratios and concentrations are those existing at the reactor entrance. A ratio of at least 0.01 mole of sulfur trioxide per mole of isobutene is necessary to obtain a 10% conversion of the isobutene charged. If lower ratios are used 90% or more of the isobutene charged passes through the system unreacted. As the mole ratio of sulfur trioxide is increased from 0.01 to 0.05, the per cent conversion of isobutene increases from 10% to about 85%. If ratios in excess of 0.05 are used, the formation of sulfonated side products becomes appreciable. In order to maintain the conversion of isobutene to side products below 15%, the mole ratio of sulfur trioxide to isobutene should be kept below 0.05.

The quantity of inert gas charged to the system has some effect upon the over-all conversion of isobutene and the relative amounts of the various products formed. A certain amount of inert gas is desirable in order to dilute the sulfur trioxide concentration at the reactor entrance. If undiluted sulfur trioxide were introduced directly into the isobutene, the formation of a large quantity of sulfonated side products would occur, although the hydrocarbon reaction mixture would still consist essentially of the indicated dimer, trimer, and tetramer, but in reduced yields. The inert gas concentration is expressed herein as the mole ratio of inert gas to the sum of inert gas and isobutene. The useful values of this ratio range from 0.05 to 0.50. A high inert gas concentration favors the formation of the dimer and diminishes the formation of tetramer and sulfonated side products. The inert gas concentration has little effect upon the conversion of isobutene to the trimer.

Changes in the total pressure of the system within the limits of from about 0.5 to about 1.0 atmosphere produce slight changes in the over-all conversion of isobutene and the relative amounts of products formed. In general, reduced pressures favor formation of the dimer and diminish formation of the tetramer. Changes in total pressure have little effect upon the conversion of isobutene to trimer and sulfonated side products. No particular advantage results from the use of pressures less than 0.5 atmosphere, and, furthermore, the over-all conversion of isobutene decreases rather rapidly with pressure below this point.

The feed rate per unit volume of reactor is not critical, since the reaction rate is extremely rapid.

The reaction temperature is not critical if maintained within the range of from about 25° to about 150° C. The temperature is important in determining the rate of reaction, but since the reaction rate is rapid at ordinary temperatures (30° C.), the use of elevated temperatures is unnecessary. Low reaction temperatures favor the polymerization reaction and diminish side product formation. Since the reaction is exothermic, the reactor temperature increases from its initial value to a steady state value where the rate at which heat is removed from the reactor is equal to the rate at which heat is generated by the reaction. The heat of reaction may be removed by an auxiliary heat exchanger or by the use of high concentration of inert gas.

The following examples illustrate typical reaction conditions. Comparison of Examples I and II illustrates the effect of changing the inert gas concentration at a constant pressure of one atmosphere. Comparison of Examples I and III illustrates the effect of changing the total pressure at a constant inert gas concentration.

*Example I.*—Starting with the apparatus at a temperature of 25° C. and a pressure of one atmosphere, the flow rate of the inert gas stream (in this case, dry air) is regulated to 0.0575 mole/hour and the isobutene feed rate is regulated to 0.865 mole/hour. With these flows established, the sulfur trioxide is introduced into the inert gas stream at a rate of 0.0270 mole/hour.

Upon contact of the sulfur trioxide-inert gas mixture with the isobutene at the reactor entrance, the reaction is initiated spontaneously, and the reactor immediately becomes filled with a white fog. The fog, caused by condensation of reaction products, collects on the sides of the reactor in the form of a liquid film. The products are withdrawn from the bottom of the reactor and collected in a cooled receiver. The inert gas and unreacted isobutene are vented from the top of this receiver. The water soluble side products are insoluble in the hydrocarbon phase and settle to the bottom of the receiver where they can be removed. The hydrocarbon phase is decanted from the side products and washed with water or dilute caustic to remove any emulsified side products. The components of the hydrocarbon phase are easily separated by fractional distillation. Reaction conditions are summarized in Table I, hydrocarbon product analyses are given in Table II, and conversion figures are listed in Table III.

*Example II.*—Starting with the reactor at a temperature of 25° C. and a pressure of one atmosphere, the flow rate of dry air is regulated to 0.424 mole/hour and the isobutene feed rate is regulated to 0.505 mole/hour. With these flows established the sulfur trioxide is introduced into the dry air stream at a rate of 0.0135 mole/hour. The rest of the procedure is identical with that used in Example I.

*Example III.*—Starting with the reactor at a temperature of 25° C. and a pressure of 0.5 atmosphere, the flow rate of dry air is regulated to 0.0932 mole/hour and the isobutene feed rate is regulated to 1.285 moles/hour. With these flow rates established, the sulfur trioxide is introduced into the dry air stream at a rate of 0.0293 mole/hour.

The rest of the procedure is similar to that used in Example I.

The process described above has the following advantages:

(1) Isobutene can be polymerized to form a liquid hydrocarbon mixture containing the following compounds: diisobutene (2, 4, 4, trimethyl pentene-1 and 2, 4, 4, trimethyl pentene-2), triisobutene (probably a pentamethyl heptene), tetraisobutene and very small amounts of higher polymers. Since these are the only compounds present, they can be easily separated by fractional distillation and recovered in relatively pure form.

(2) The sulfur trioxide catalyst is removed from the system in the sulfonated side products. Since these products are themselves useful, there is no spent catalyst disposal problem.

(3) Within limits, the relative amounts of polymer and sulfonated side products can be controlled by proper regulation of process variables.

TABLE I

*Reaction conditions*

|  | Ex. I | Ex. II | Ex. III |
|---|---|---|---|
| moles sulfur trioxide/mole isobutene | 0.0312 | 0.0267 | 0.0223 |
| moles air/(moles air+moles isobutene) | 0.0625 | 0.456 | 0.0675 |
| moles sulfur trioxide/mole air | 0.47 | 0.0318 | 0.315 |
| total pressure, atmospheres | 1.0 | 1.0 | 0.5 |
| Reaction Temperature °C | 100 | 70 | 60 |

TABLE II

*Analysis of hydrocarbon polymer*

| Compound | B.P., °C. | $n_D^{20}$ | Liquid Volume, Percent | | |
|---|---|---|---|---|---|
|  |  |  | Ex. I | Ex. II | Ex. III |
| Dimer | 99 | 1.409 | 7.5 | 20.0 | 23.5 |
| Trimer | 177 | 1.429 | 66.0 | 63.5 | 59.0 |
| Tetramer | 250 | 1.449 | 26.5 | 16.5 | 17.5 |

TABLE III

*Per cent conversion of isobutene charged*

|  | Example I | Example II | Example III |
|---|---|---|---|
| Dimer | 4.7 | 10.5 | 8.3 |
| Trimer | 35.7 | 33.4 | 20.7 |
| Tetramer | 17.8 | 8.7 | 6.1 |
| Side products | 7.2 | 6.4 | 4.3 |
| Unreacted | 34.6 | 41.0 | 60.6 |

Although I have in the foregoing described the preferred embodiment of my invention, as non-fully equivalent alternatives I may pass isobutene in either liquid or vapor phase over sulfur trioxide while the latter is adsorbed on a bed of solid, porous material such as silica gel, filtrol or other relatively inert adsorbing medium. Although such alternatives are less desirable because the activity of the solid bed catalyst decreases rapidly due to the accumulation of side reaction products on the surface, the hydrocarbon reaction product formed still consists of the simple, low molecular weight polymer mixture previously described.

I claim as my invention:

1. The method of polymerizing isobutene to form a hydrocarbon reaction product mixture composed essentially of low molecular weight polyisobutenes, which comprises contacting isobutene in the vapor phase with anhydrous sulfur trioxide in the vapor phase in the proportion of from .01 to .05 mole of sulfur trioxide to 1 mole of isobutene.

2. The method of polymerizing isobutene to form a hydrocarbon reaction product mixture composed essentially of diisobutene, triisobutene and tetraisobutene, which comprises contacting isobutene in the vapor phase with anhydrous sulfur trioxide in the vapor phase in the proportion of from .01 to .05 mole of sulfur trioxide to 1 mole of isobutene.

3. The method of polymerizing isobutene to form a hydrocarbon reaction product mixture composed essentially of diisobutene, triisobutene and tetraisobutene, which comprises contacting isobutene in the vapor phase with dilute anhydrous sulfur trioxide in the vapor phase in the proportion of from .01 to .05 mole of sulfur trioxide to 1 mole of isobutene, and separating a resulting hydrocarbon phase layer as the principal product of the process from a water soluble, hydrocarbon insoluble, sulfonated phase layer side products of the process.

4. The method of polymerizing isobutene to form a hydrocarbon reaction product mixture composed essentially of diisobutene, triisobutene and tetraisobutene, which comprises contacting isobutene in the vapor phase with dilute anhydrous sulfur trioxide in the vapor phase in the proportion of from .01 to .05 mole of sulfur trioxide to 1 mole of isobutene at a temperature of from about 25° C. to about 150° C., and at a pressure of from about 0.5 to about 1 atmosphere.

5. The method of polymerizing isobutene to form a hydrocarbon reaction product mixture composed essentially of diisobutene, triisobutene and tetraisobutene, which comprises contacting isobutene in the vapor phase with a vapor phase mixture of anhydrous sulfur trioxide and a relatively inert gaseous diluent therefor, in the proportion of from .01 to .05 mole of sulfur trioxide to 1 mole of isobutene.

6. The method of polymerizing isobutene to form a hydrocarbon reaction product mixture composed essentially of diisobutene, triisobutene and tetraisobutene, which comprises contacting isobutene in the vapor phase with a vapor phase mixture of anhydrous sulfur trioxide and a relatively inert gaseous diluent therefor, in the proportion of from .01 to .05 mole of sulfur trioxide to 1 mole of isobutene at a temperature of from about 25° C. to about 150° C., and at a pressure of from about 0.5 to about 1 atmosphere, the mole ratio of inert gas to the sum of inert gas and isobutene being in the range of from about .05 to about .50.

MURLIN T. HOWERTON.

References Cited in the file of this patent

UNITED STATES PATENTS

| Number | Name | Date |
|---|---|---|
| 1,935,162 | Morrell | Nov. 14, 1933 |
| 1,946,131 | Davis | Feb. 6, 1934 |
| 2,434,833 | Ciapetta | Jan. 20, 1948 |

OTHER REFERENCES

Sachanen, Conversion of Petroleum (2nd ed., 1948), p. 371; Reinhold Pub. Corp.

Sachanen, Conversion of Petroleum (2nd ed., 1948), pages 369–370.

Lebeolev, Zhur Obshchei Kim, vol. 18, pp. 1696–1698 (1948); noted C. A. 2569 (c) (1949).